US012794155B2

(12) United States Patent
Henry et al.

(10) Patent No.: US 12,794,155 B2
(45) Date of Patent: Nov. 10, 2026

(54) RECEPTACLE CONNECTOR HAVING FLEXIBLE CIRCUIT CONDUCTORS

(71) Applicant: TE Connectivity Solutions GmbH, Schaffhausen (CH)

(72) Inventors: Randall Robert Henry, Lebanon, PA (US); Alan Weir Bucher, Manheim, PA (US); Brian Patrick Costello, Athens, GA (US); Brandon Michael Matthews, McAlisterville, PA (US)

(73) Assignee: TE CONNECTIVITY SOLUTIONS GmbH, Schaffhausen (CH)

( * ) Notice: Subject to any disclaimer, the term of this patent is extended or adjusted under 35 U.S.C. 154(b) by 258 days.

(21) Appl. No.: 18/488,069

(22) Filed: Oct. 17, 2023

(65) Prior Publication Data

US 2025/0125548 A1 Apr. 17, 2025

(51) Int. Cl.
*H01R 12/79* (2011.01)
*H01R 12/71* (2011.01)

(52) U.S. Cl.
CPC ........... *H01R 12/79* (2013.01); *H01R 12/712* (2013.01)

(58) Field of Classification Search
CPC ...... H01R 12/79; H01R 12/712; H01R 12/73; H01R 12/737
USPC .......................................... 439/637, 65, 77
See application file for complete search history.

(56) References Cited

U.S. PATENT DOCUMENTS

| | | | | |
|---|---|---|---|---|
| 4,969,824 | A * | 11/1990 | Casciotti | H01R 12/62 439/62 |
| 5,171,154 | A * | 12/1992 | Casciotti | H01R 12/7082 439/465 |
| 12,424,785 | B2 * | 9/2025 | Henry | H01R 13/502 |
| 2024/0128685 | A1 | 4/2024 | Balakrishnan et al. | |
| 2024/0250480 | A1 * | 7/2024 | Henry | H01R 13/6594 |
| 2024/0380153 | A1 * | 11/2024 | Henry | H01R 12/73 |

* cited by examiner

*Primary Examiner* — Hae Moon Hyeon

(57) ABSTRACT

A receptacle connector includes a receptacle housing having a housing mounting end configured to be mounted to a host circuit board and a slot at a housing mating end configured to receive a mating end of a pluggable module. The receptacle housing includes contact pockets that receive interposer contacts. The receptacle connector includes a flexible circuit having circuit conductors extending between a mating end and a terminating end configured to be terminated to the host circuit board. Each interposer contact includes an inner mating interface forming a separable interface configured to be mated with module contacts of the pluggable module and an outer mating interface connected to the mating end of the corresponding circuit conductor.

19 Claims, 7 Drawing Sheets

RECEPTACLE CONNECTOR HAVING FLEXIBLE CIRCUIT CONDUCTORS

BACKGROUND OF THE INVENTION

The subject matter herein relates generally to electrical connectors.

Some communication systems utilize communication connectors, such as receptacle connectors to interconnect various components of the system for data communication. Some known communication systems use pluggable modules, such as I/O modules or circuit cards, which are electrically connected to the receptacle connectors. The pluggable modules may have module circuit boards or contact arrays that are plugged into the receptacle connectors during the mating operation. The receptacle connectors may be card edge connectors having an upper row of contacts and a lower row of contacts for mating with a corresponding circuit board.

Known connectors are not without disadvantages. For instance, the contacts of the connectors are arranged in a row and held in the housing of the receptacle connector. At high speeds, the receptacle connector is susceptible to performance degradation, such as due to cross talk between the contacts. Additionally, the contacts are exposed to multiple impedance discontinuities along the lengths of the contacts due to changes in interfaces with the housing and changes in geometries of the contacts. The impedance discontinuities lead to signal degradation.

A need remains for a reliable high speed receptacle connector.

BRIEF DESCRIPTION OF THE INVENTION

In one embodiment, a receptacle connector is provided and includes a receptacle housing having a cavity. The receptacle housing has a housing mating end and a housing mounting end. The housing mounting end is configured to be mounted to a host circuit board. The receptacle housing has a slot at the housing mating end configured to receive a mating end of a pluggable module. The receptacle housing includes contact pockets arranged in at least one row. The receptacle connector includes a flexible circuit received in the cavity. The flexible circuit has a mating end and a terminating end. The flexible circuit includes circuit conductors extending between the mating end and the terminating end. The circuit conductors configured to be terminated to the host circuit board at the terminating end. The receptacle connector includes interposer contacts received in the corresponding contact pockets. Each interposer contact includes an inner mating interface and an outer mating interface. The inner mating interface forming a separable interface configured to be mated with module contacts of the pluggable module. The outer mating interface is connected to the mating end of the corresponding flexible circuit conductor.

In another embodiment, a receptacle connector is provided and includes a receptacle housing having a cavity. The receptacle housing has a housing mating end and a housing mounting end. The housing mounting end is configured to be mounted to a host circuit board. The receptacle housing has a slot at the housing mating end configured to receive a mating end of a pluggable module. The receptacle housing includes contact pockets arranged in at least one row. The receptacle connector includes a flexible circuit received in the cavity. The flexible circuit has a mating end and a terminating end. The flexible circuit includes circuit conductors extending between the mating end and the terminating end. The circuit conductors are configured to be terminated to the host circuit board at the terminating end. The receptacle connector includes a flexible circuit support to support the flexible circuit in the receptacle housing. The flexible circuit support includes a carrier and support elements extending from the carrier. The support elements engage the flexible circuit to support the mating end of the flexible circuit. The receptacle connector includes interposer contacts received in the corresponding contact pockets. Each interposer contact includes an inner mating interface and an outer mating interface. The inner mating interface forms a separable interface configured to be mated with the pluggable module. The outer mating interface is connected to the mating end of the corresponding flexible circuit conductor. The support elements press the circuit conductors into mating engagement with the interposer contacts.

In a further embodiment, a receptacle connector is provided and includes a receptacle housing having a cavity. The receptacle housing has a housing mating end and a housing mounting end. The housing mounting end is configured to be mounted to a host circuit board. The receptacle housing has a slot at the housing mating end configured to receive a mating end of a pluggable module. The receptacle housing includes contact pockets arranged in at least one row. The receptacle connector includes a flexible circuit received in the cavity. The flexible circuit has a mating end and a terminating end. The flexible circuit includes circuit conductors extending between the mating end and the terminating end. The circuit conductors are configured to be terminated to the host circuit board at the terminating end. The receptacle connector includes interposer contacts received in the corresponding contact pockets. Each interposer contact includes a contact body and a contact support holding the contact body. The contact support includes a dielectric body surrounding a portion of the contact body. The contact support extends between an inner end and an outer end. The contact body includes an inner mating interface extending from the inner end for mating with the pluggable module. The contact body includes an outer mating interface extending from the outer end for mating with the mating end of the corresponding flexible circuit conductor.

DETAILED DESCRIPTION OF THE INVENTION

Figure 1:
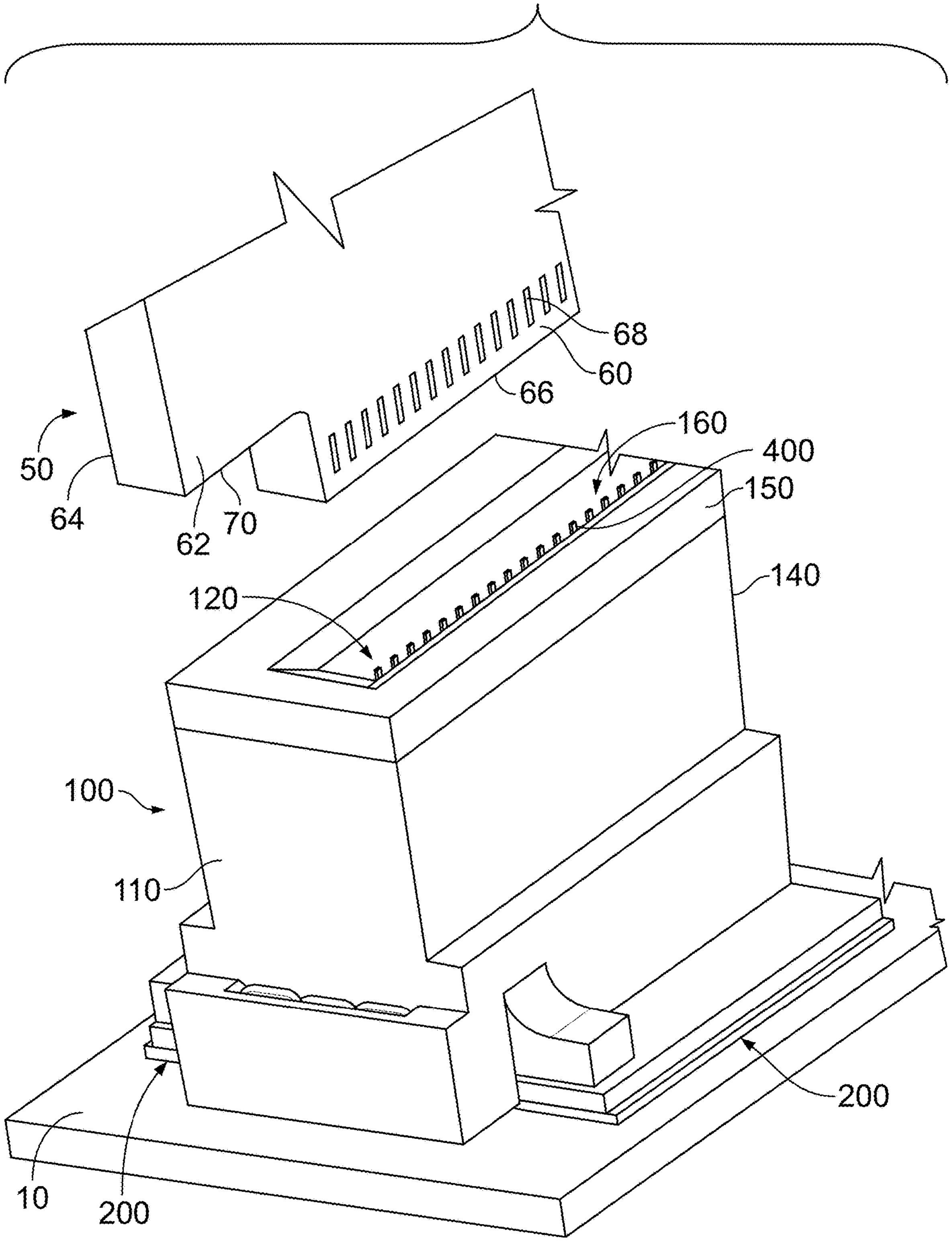
FIG. 1 is a front perspective view of a receptacle connector in accordance with an exemplary embodiment.
Figure 2:
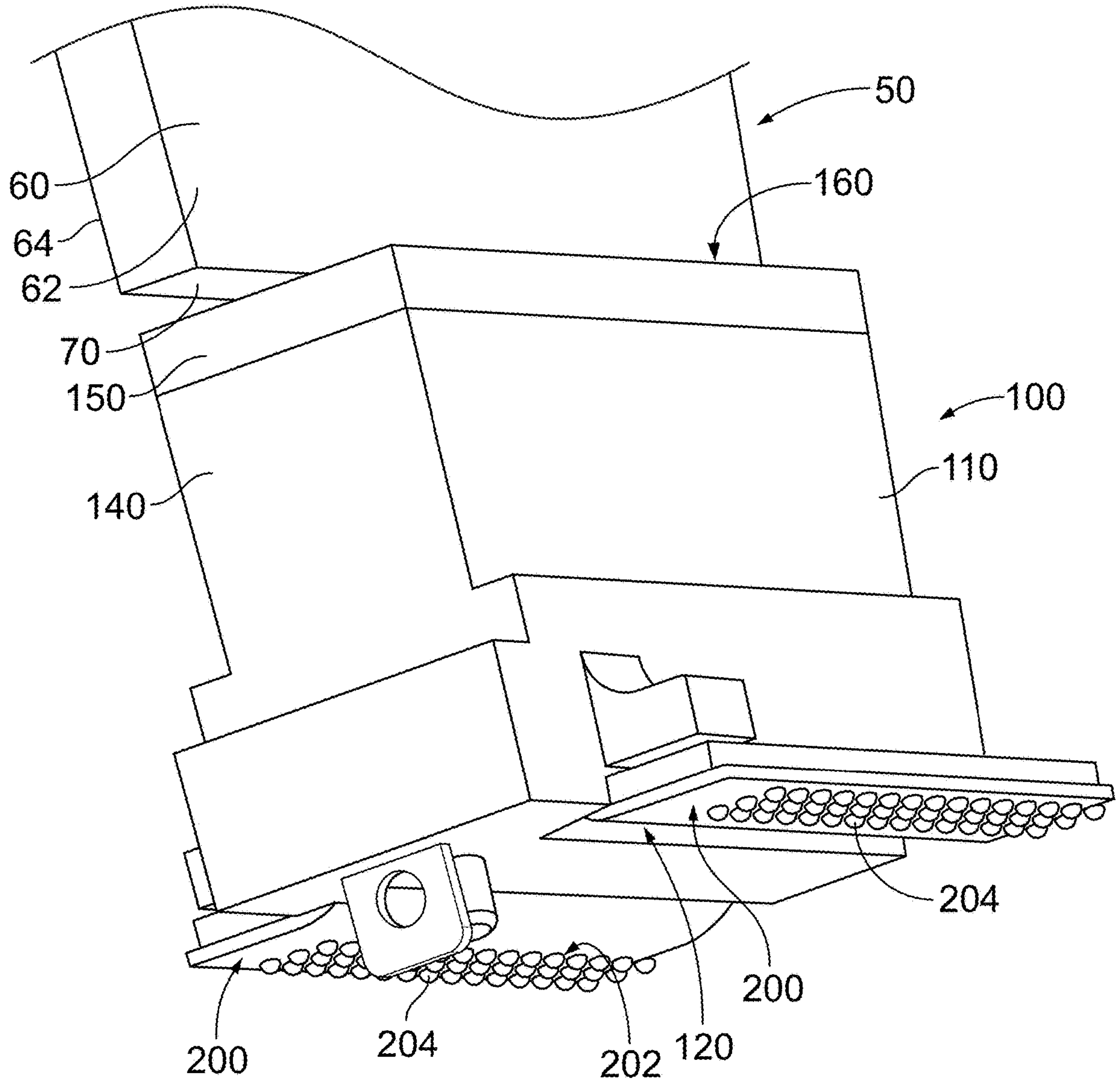
FIG. 2 is a rear perspective view of the receptacle connector in accordance with an exemplary embodiment.

FIG. 1 is a front perspective view of a receptacle connector 100 in accordance with an exemplary embodiment. FIG. 2 is a rear perspective view of the receptacle connector 100 in accordance with an exemplary embodiment. The receptacle connector 100 is configured to be mounted to a host circuit board 10 (FIG. 1). The receptacle connector 100 is configured to be mated with a pluggable module 50 to electrically connect the pluggable module 50 with the host circuit board 10. In an exemplary embodiment, the receptacle connector 100 is a card edge connector. However, the receptacle connector 100 may be another type of electrical connector in alternative embodiments, such as a plug connector. In other alternative embodiments, the receptacle connector 100 may be terminated to wires or cables rather than the host circuit board 10.

In an exemplary embodiment, the pluggable module 50 includes a circuit card 60 configured to be plugged into a slot 160 of the receptacle connector 100. The circuit card 60 may be a paddle card in various embodiments. The circuit card 60 may be a daughtercard or other type of card in other embodiments. Optionally, the pluggable module 50 may include a plug housing (not shown) surrounding and holding the pluggable module 50. For example, the pluggable module 50 may be an input/output (I/O) module, such as a transceiver module with the module circuit card surrounded by a shell or body surrounding the circuit card. The pluggable module 50 may include one or more cables or wires electrically connected to the pluggable module 50. The pluggable module 50 may include one or more electrical components, such as a chip, a memory module, a processor, an optical/digital converter, or other type of electrical component mounted to the pluggable module 50. Other types of pluggable modules may be used in alternative embodiments, such as pluggable modules that do not include a circuit card. For example, the pluggable module 50 may include a flex circuit rather than a rigid circuit card. The pluggable module 50 may include an array of contacts, such as flat stamped contact pads rather than a circuit card.

The circuit card 60 includes a first or upper surface 62 and a second or lower surface 64 (for example, when the circuit card 60 is oriented horizontally). The circuit card 60 includes a card edge 66 at the mating end of the circuit card 60 configured to be plugged into the slot 160 of the receptacle connector 100. The pluggable module 50 includes module contacts 68 (FIG. 1) configured to be electrically connected to the receptacle connector 100 when plugged into the slot 160 of the receptacle connector 100. For example, the contacts 68 may be circuit pads at the card edge 66 of the circuit card 60 configured to be electrically connected to the receptacle connector 100 when plugged into the slot 160 of the receptacle connector 100. The contacts 68 may be provided on the upper surface 62 and/or the lower surface 64. The contacts 68 of the pluggable module 50 may be other types of contacts in alternative embodiments. For example, the contacts 68 may be an array of stamped and formed contacts held by a carrier or housing of the pluggable module 50. The contacts 68 may be circuit traces of a flexible circuit in alternative embodiments.

In the illustrated embodiment, the circuit card 60 includes shoulders 70 and one or both sides of the card edge 66. The shoulders 70 may bottom out against the receptacle connector 100 when the circuit card 60 is plugged into the slot 160 of the receptacle connector 100.

The receptacle connector 100 includes a receptacle housing 110 forming the slot 160, one or more flexible circuits 200 held by the receptacle housing 110, and interposer contacts 400 arranged in the slot 160 to mate with the pluggable module 50. In an exemplary embodiment, the receptacle connector 100 includes two of the flexible circuits 200, such as an upper flexible circuit at the top of the receptacle housing 110 and a lower flexible circuit at a bottom of the receptacle housing 110. The receptacle housing 110 includes a cavity 120 that receives the flexible circuits 200 and the interposer contacts 400. The slot 160 forms a portion of the cavity 120. In an exemplary embodiment, the interposer contacts 400 are arranged in rows on both sides of the slot 160 to mate with both sides of the pluggable module 50. The interposer contacts 400 electrically connect the flexible circuits 200 to the module contacts 68 of the pluggable module 50. In an exemplary embodiment, the interposer contacts 400 have separable interfaces configured to mate with the flexible circuits 200 and separable interfaces configured to mate with the pluggable module 50. In other embodiments, the interposer contacts 400 may be permanently attached to the flexible circuits 200, such as using solder between the interposer contacts 400 and the flexible circuits 200.

In an exemplary embodiment, the receptacle housing 110 is a multi-piece housing. For example, the receptacle housing 110 includes a rear housing or outer shell 140 and a front housing or housing insert 150 coupled to the outer shell 140. The housing insert 150 extends forward of the outer shell 140. The housing insert 150 is received in the outer shell 140. The outer shell 140 surrounds a portion of the housing insert 150. The housing insert 150 holds the interposer contacts 400. The housing insert 150 and/or the outer shell 140 may hold the flexible circuits 200. For example, the flexible circuits 200 may be located between the outer shell 140 and the housing insert 150. The cavity 120 is formed by the housing insert 150 and/or the outer shell 140. In an exemplary embodiment, the housing insert 150 includes the slot 160 that receives the pluggable module 50. The housing insert 150 guides the pluggable module 50 into mating engagement with the interposer contacts 400 as the card edge 66 of the pluggable module 50 is loaded into the slot 160. The interposer contacts 400 are configured to be electrically connected to the contacts 68 of the pluggable module 50 when the card edge 66 is plugged into the slot 160. The interposer contacts 400 are configured to be electrically connected to the flexible circuits 200, such as to circuit conductors 202 of the flexible circuits. The circuit conductors 202 may include traces, pads, vias, and the like routed along one or more layers of the flexible circuits 200. The flexible circuits 200 are configured to be terminated to the host circuit board 10. In the illustrated embodiment, a ball grid array (BGA) of solder balls 204 are electrically connected to the corresponding circuit conductors 202 and positioned for termination to the host circuit board 10.

Figure 3:
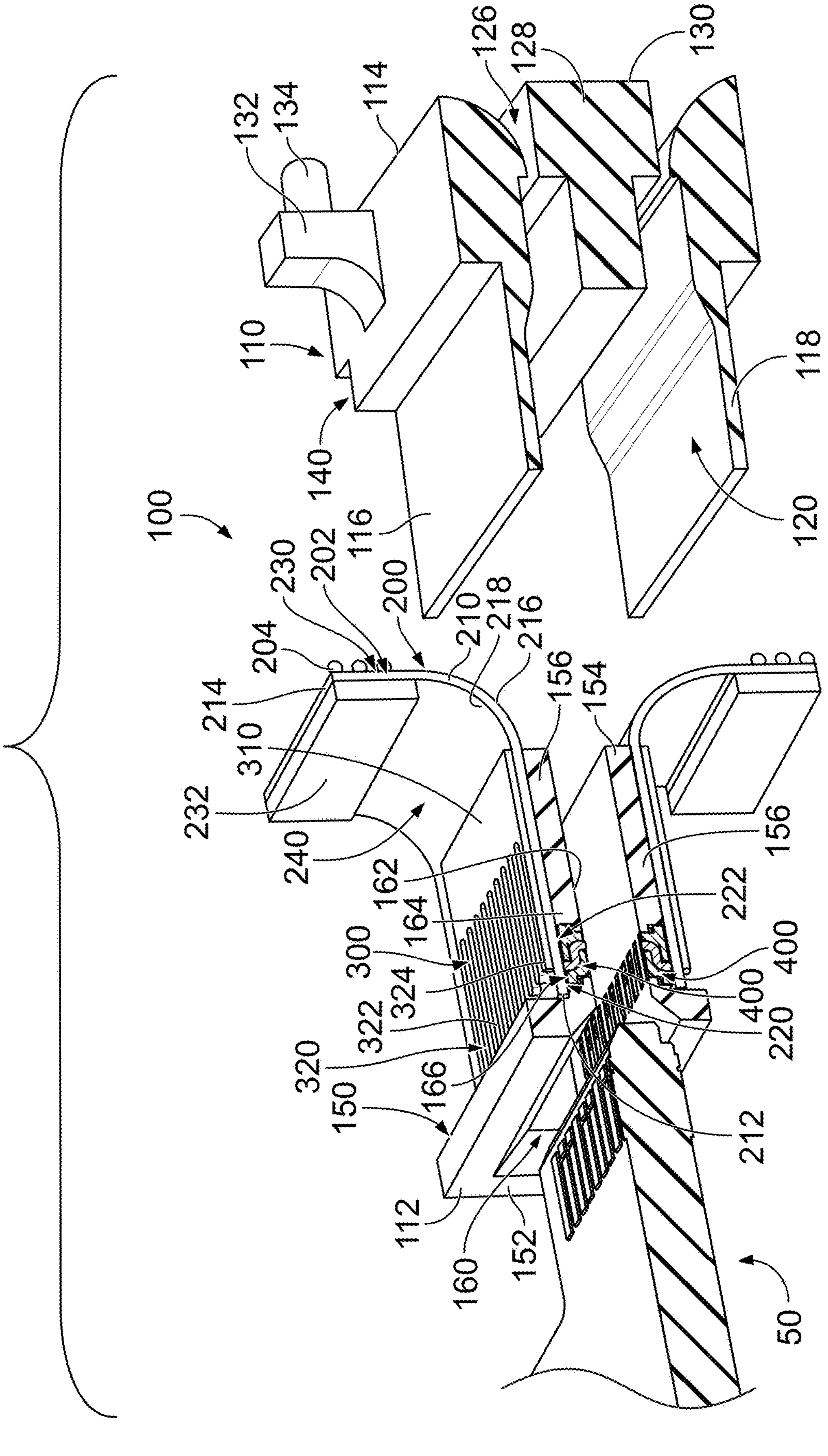
FIG. 3 is an exploded view of the receptacle connector in accordance with an exemplary embodiment.

FIG. 3 is an exploded view of the receptacle connector 100 in accordance with an exemplary embodiment. FIG. 3 shows a portion of the receptacle housing 110 and flexible circuits 200 (for example, upper and lower flexible circuits). In an exemplary embodiment, the receptacle connector 100 includes a flexible circuit support 300 for supporting the flexible circuit 200. The flexible circuit support 300 ensures reliable electrical connection between the flexible circuit 200 and the interposer contacts 400 and between the interposer contacts 400 and the pluggable module 50.

The receptacle housing 110 is manufactured from a dielectric material, such as a plastic material. The receptacle housing 110 may be a molded part. The receptacle housing 110 extends between a front 112 and a rear 114. The receptacle housing 110 includes an upper wall 116 and a lower wall 118 that extend between the front 112 and the rear 114. The cavity 120 extends between the front 112 and the rear 114. The cavity 120 is located between the upper wall 116 and the lower wall 118. The cavity 120 receives the flexible circuit support 300 and the flexible circuit 200. For example, the flexible circuit support 300 and the flexible circuit 200 may be received in a flexible circuit pocket 126 of the cavity 120. The flexible circuit pocket 126 may be located proximate to the rear 114. For example, the flexible circuit pocket 126 may extend through a base wall 128 of the receptacle housing 110 at the rear 114. The housing insert 150 may be received in a front portion of the cavity 120, such as at the front end of the outer shell 140.

The receptacle housing 110 includes a mounting base 130 at the rear 114 configured to be mounted to the host circuit board 10. The mounting base 130 may include one or more mounting blocks 132 at the rear 114. The mounting base 130 may include locating pins extending from the rear 114. The locating pins are configured be received in openings in the host circuit board 10 to locate the receptacle connector 100 relative to the host circuit board 10, such as to locate the receptacle connector 100 relative to board contacts on the host circuit board 10. In an exemplary embodiment, the mounting base 130 may hold solder tabs (not shown) that extend from the base wall 128 for mounting to the host circuit board 10. The solder tabs are configured to be soldered to the host circuit board 10 to mechanically secure the receptacle connector 100 to the host circuit board 10. The solder tabs may provide strain relief for the solder balls 204. Other types of securing features may be used in alternative embodiments, such as threaded fasteners, clips, latches or other types of securing features.

In an exemplary embodiment, the receptacle housing 110 includes connecting posts 134 at the rear 114 for mechanically connecting the flexible circuits 200 to the receptacle housing 110. The connecting posts 134 are used to locate the flexible circuits 200 relative to the receptacle housing 110 (for example, side to side and/or top to bottom). The connecting posts 134 are used to secure the flexible circuits 200 to the receptacle housing 110. Other types of locating and/or securing features may be used in alternative embodiments to connect the flexible circuits 200 to the receptacle housing 110.

The housing insert 150 is manufactured from a dielectric material, such as a plastic material. The housing insert 150 may be a molded part. Optionally, the housing insert 150 may be manufactured from a different material than the receptacle housing 110. The housing insert 150 extends between a front 152 and a rear 154. The housing insert 150 includes a support wall 156 that extend between the front 152 and the rear 154. The housing insert 150 includes the slot 160, which may be defined by the support wall(s) 156. The support wall 156 includes an inner surface 162 and an outer surface 164. The inner surface 162 faces the slot 160. The flexible circuit 200 may extend along and be coupled to the outer surface 164.

The housing insert 150 includes contact pockets 166 in the support wall 156. Each contact pocket 166 receives a corresponding interposer contact 400. The contact pockets 166 are separated from each other to electrically isolate the interposer contacts 400 from each other. In the illustrated embodiment, the contact pockets 166 are located proximate to the front 152. The contact pockets 166 locate the interposer contacts 400 for mating with the pluggable module 50 and with the circuit conductors of the flexible circuit 200.

In an exemplary embodiment, the flexible circuit support 300 is received in the cavity 120 and is used to support the flexible circuit 200 in the receptacle housing 110. In the illustrated embodiment, the flexible circuit support 300 is coupled to the flexible circuit 200. However, the flexible circuit support 300 may be coupled to the outer shell 140 and/or the housing insert 150 in alternative embodiments. The flexible circuit support 300 is used to press the flexible circuit 200 inward to ensure electrical connection with the interposer contacts 400.

In an exemplary embodiment, the flexible circuit support 300 is a stamped and formed part. The flexible circuit support 300 includes a carrier 310 and a plurality of support elements 320. The support elements 320 extend from the carrier 310, such as forward of the carrier 310. The carrier 310 is provided at a rear of the flexible circuit support 300. The carrier 310 holds the support elements 320 relative to each other. In an exemplary embodiment, the support elements 320 include spring fingers 322 that are movable independent from each other. For example, the spring fingers 322 may be cantilevered from the carrier 310. In an exemplary embodiment, the spring fingers 322 extend parallel to each other. The spring fingers 322 may be oriented parallel to the loading direction for loading the pluggable module 50 into the slot 160. Each support elements 320 extends to a distal end 324. Optionally, the front portions of the support elements 320 may be curved to interface with the flexible circuit 200.

The flexible circuit 200 is a flexible electronic circuit that may be conformed or flexed into a desired shape during use. The flexible circuit 200 includes a flexible plastic substrate 210. The substrate 210 may be polyimide, polyether ether ketone (PEEK), or a polyester film. The circuit conductors 202 are formed on one or more layers of the substrate 210. For example, the circuit conductors 202 may be traces, pads, vias or other circuit components printed on the layers of the substrate 210. In an exemplary embodiment, the flexible circuit 200 includes one or more ground planes to provide shielding for the signal lines of the flexible circuit 200. The flexible circuit 200 may be a flexible flat cable in alternative embodiments. The substrate 210 includes a front edge 212 and a rear edge 214. The substrate 210 includes an inner side 216 and an outer side 218. The inner side 216 is configured to interface with the interposer contacts 400 and the host circuit board 10.

The flexible circuit 200 extends between a mating end 220 and a terminating end 230. The mating end 220 is configured to be mated to the interposer contacts 400. In various embodiments, the mating end 220 is mated to the interposer contacts 400 at separable interfaces. In other embodiments, the interposer contacts 400 may be permanently attached to the flexible circuits 200, such as using solder between the interposer contacts 400 and the flexible circuits 200. The flexible circuit support 300 is used to support the mating end 220 for mating with the interposer contacts 400. For example, the support elements 320 may press against the flexible circuit 200 at the mating end 220. The terminating end 230 is configured to be terminated to the host circuit board 10. The circuit conductors 202 extend between the mating end 220 and the terminating end 230 to electrically connect the interposer contacts 400 and the host circuit board 10. In an exemplary embodiment, the flexible circuit 200 includes a transition portion 240 between the mating end 220 and the terminating end 230. In the illustrated embodiment, the transition portion 240 transitions through a right angle bend to orient the mating end 220 perpendicular to the terminating end 230. Optionally, the mating end 220 may be generally planar and the terminating end 230 may be generally planar.

In an exemplary embodiment, the flexible circuit 200 includes a stiffener 232 at the terminating end 230. The stiffener 232 is rigid. The stiffener 232 may be planar. The terminating end 230 is coupled to the stiffener 232 to hold a shape of the terminating end 230, such as for connection to the host circuit board 10. In an exemplary embodiment, the solder balls 204 are provided along the inner side 216 at the terminating end 230. The solder balls 204 electrically connect the corresponding circuit conductors 202 to pads or contacts on the host circuit board 10. In an exemplary embodiment, the stiffener 232 may be heat staked to the terminating end 230. The stiffener 232 is configured to be coupled to the receptacle housing 110, such as to the connecting posts 134.

In an exemplary embodiment, the circuit conductors 202 include mating portions 222 on the inner side 216 of the substrate 210 at the mating end 220. The mating portions 222 are configured to be mated directly to the interposer contacts 400. The circuit conductors 202 may include signal conductors and/or ground conductors and/or power conductors. The signal conductors form signal lines that allow data communication through the flexible circuit 200. The ground conductors, when used, provide shielding for the signal conductors. The ground conductors are configured to be electrically connected to the one or more ground planes, such as using vias through the substrate 210. The power conductors, when used, allow power transmission through the flexible circuit 200.

Figure 4:
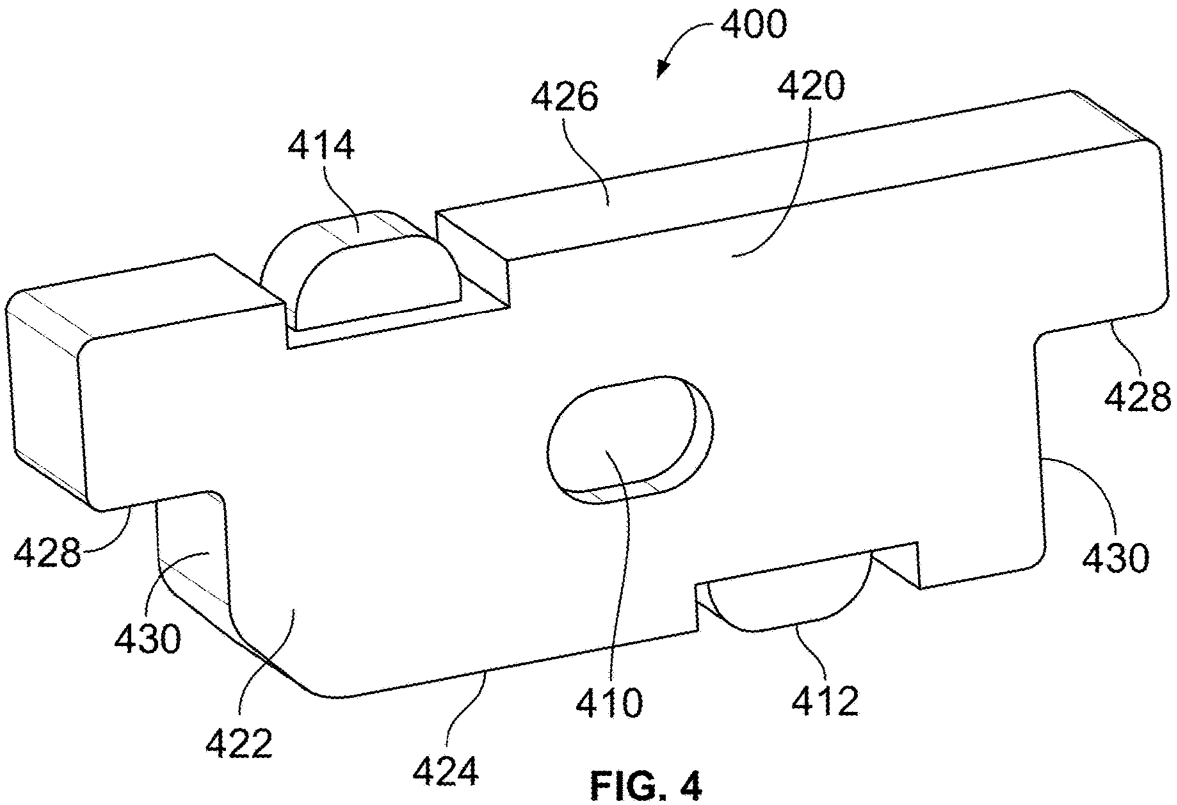
FIG. 4 is a perspective view of the interposer contact in accordance with an exemplary embodiment.

FIG. 4 is a perspective view of the interposer contact 400 in accordance with an exemplary embodiment. The interposer contact 400 includes a contact body 410 including an inner mating interface 412 for mating with the pluggable module 50 and an outer mating interface 414 for mating with the flexible circuit 200. The contact body 410 is electrically conductive to electrically connect the conductors of the pluggable module 50 and the flexible circuit 200. The contact body 410 may be a stamped and formed metal element. In an exemplary embodiment, the inner mating interface 412 is a separable interface. In an exemplary embodiment, the outer mating interface 414 is a separable interface.

In an exemplary embodiment, the interposer contact 400 includes a contact support 420 holding the contact body 410. The contact support 420 is used to position the interposer contact 400 in the contact pocket of the receptacle housing 110. In an exemplary embodiment, the contact support 420 includes a dielectric body 422 surrounding a portion of the contact body 410. The contact support 420 may be an overmold body that is overmolded over the contact body 410. The contact support 420 extends between an inner end 424 and an outer end 426. The contact support 420 includes sides 430 between the inner and outer ends 424, 426. The sides 430 may be planar and parallel to each other. The inner and outer ends 424, 426 may be planar and parallel to each other. In an exemplary embodiment, the inner mating interface 412 of the contact body 410 extends from the inner end 424 for mating with the pluggable module 50. The outer mating interface 414 extends from the outer end 426 for mating with the circuit conductor of the flexible circuit 200.

In an exemplary embodiment, the contact support 420 includes support tabs 428 at the front and rear edges of the contact support 420. The support tabs 428 are configured to engage the receptacle housing 110 to locate the interposer contact 400 in the contact pocket. In alternative embodiments, the interposer contacts 400 may be supported by the flexible circuit 200 rather than using the support tabs 428. For example, the interposer contacts 400 may be soldered to the flexible circuit 200 and hang from the flexible circuit 200 into the pocket.

In an exemplary embodiment, the contact body 410 follows a curved path between the inner and outer mating interfaces 412, 414. For example, the inner mating interface 412 is offset from the outer mating interface 414. In the illustrated embodiment, the inner mating interface 412 is shifted rearward and the outer mating interface 414 is shifted forward. However, in alternative embodiments, the inner mating interface 412 is shifted forward and the outer mating interface 414 is shifted rearward. In other alternative embodiments, the contact body 410 is straight such that the inner and outer mating interfaces 412, 414 are aligned, such as both being approximately centered.

Figure 5:
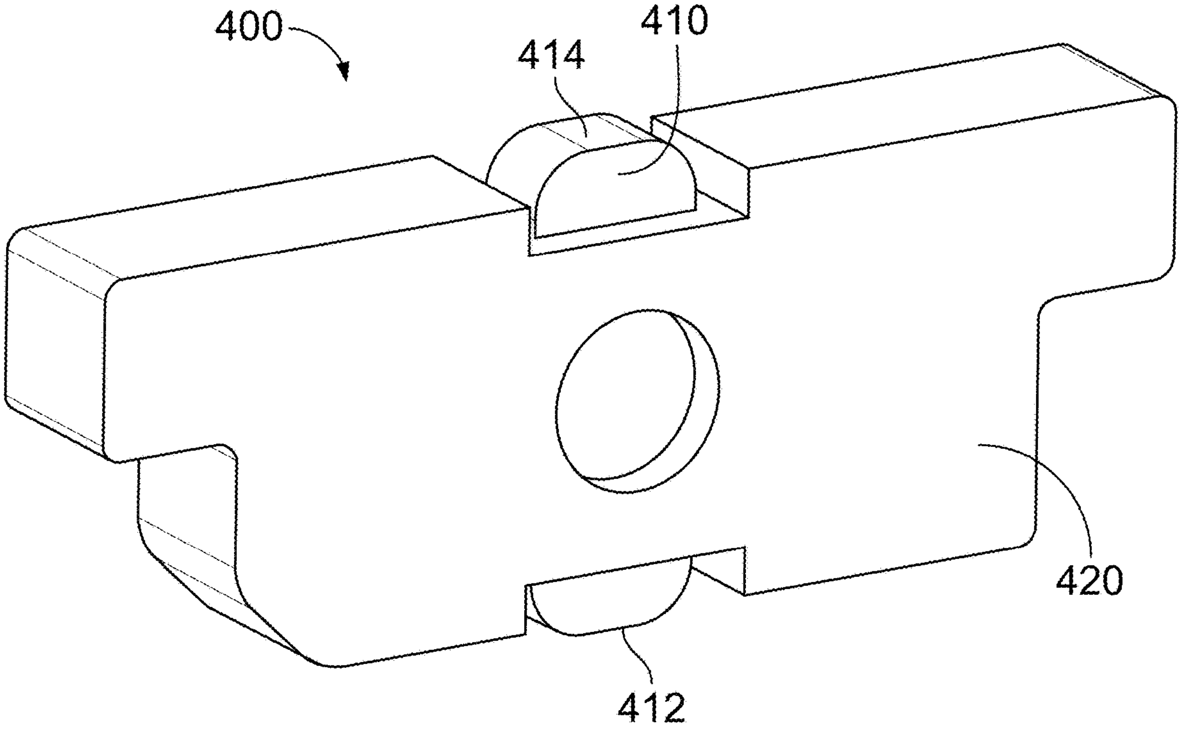
FIG. 5 is a perspective view of the interposer contact in accordance with an exemplary embodiment.

FIG. 5 is a perspective view of the interposer contact 400 in accordance with an exemplary embodiment. In the illustrated embodiment, the contact body 410 passes straight through the contact support 420. For example, the inner and outer mating interfaces 412, 414 are aligned. In the illustrated embodiment, the inner and outer mating interfaces 412, 414 are centered between the front and rear edges of the contact support 420.

Figure 6:
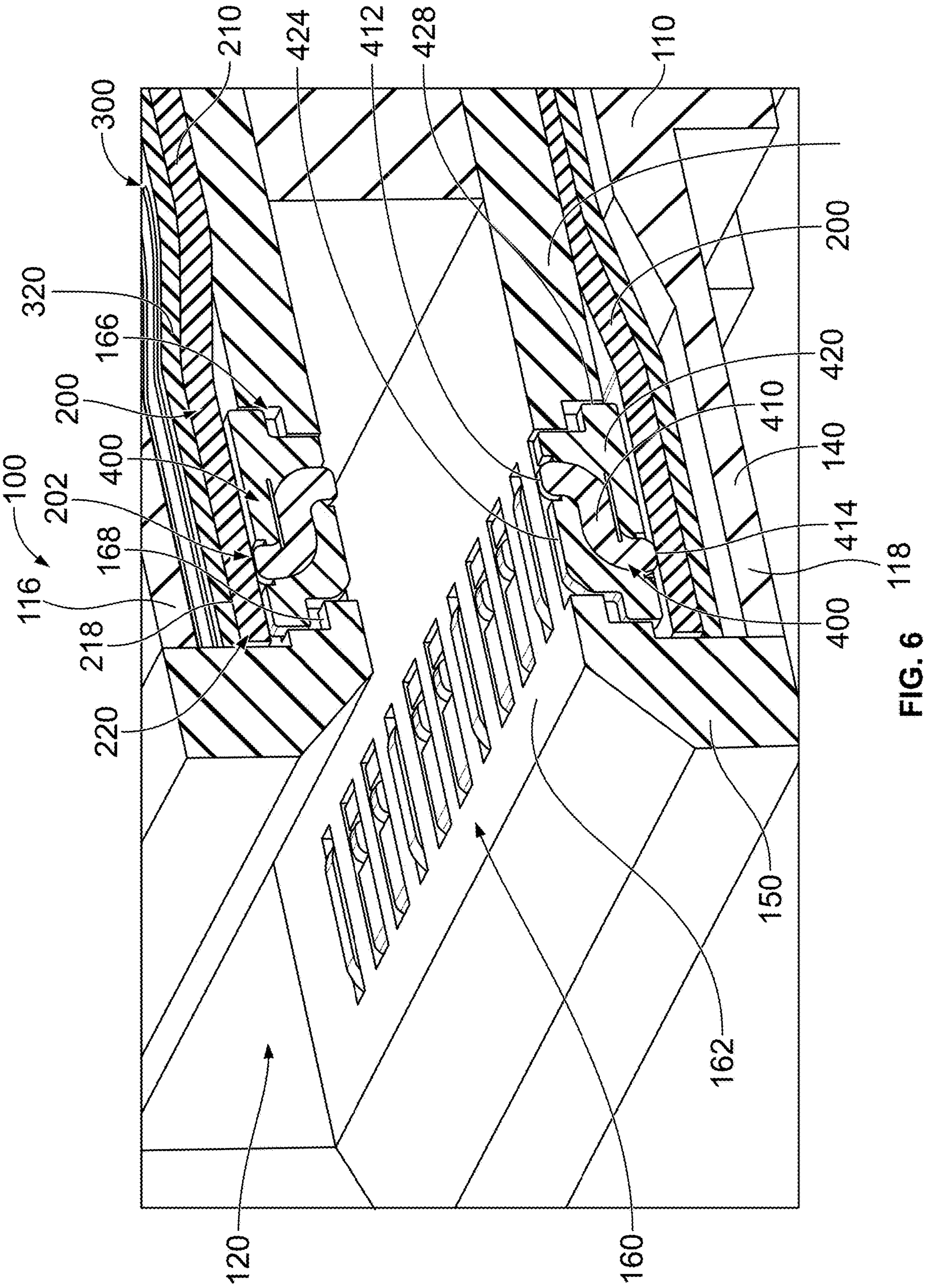
FIG. 6 is a front perspective, partial sectional view of the receptacle connector in accordance with an exemplary embodiment.
Figure 7:
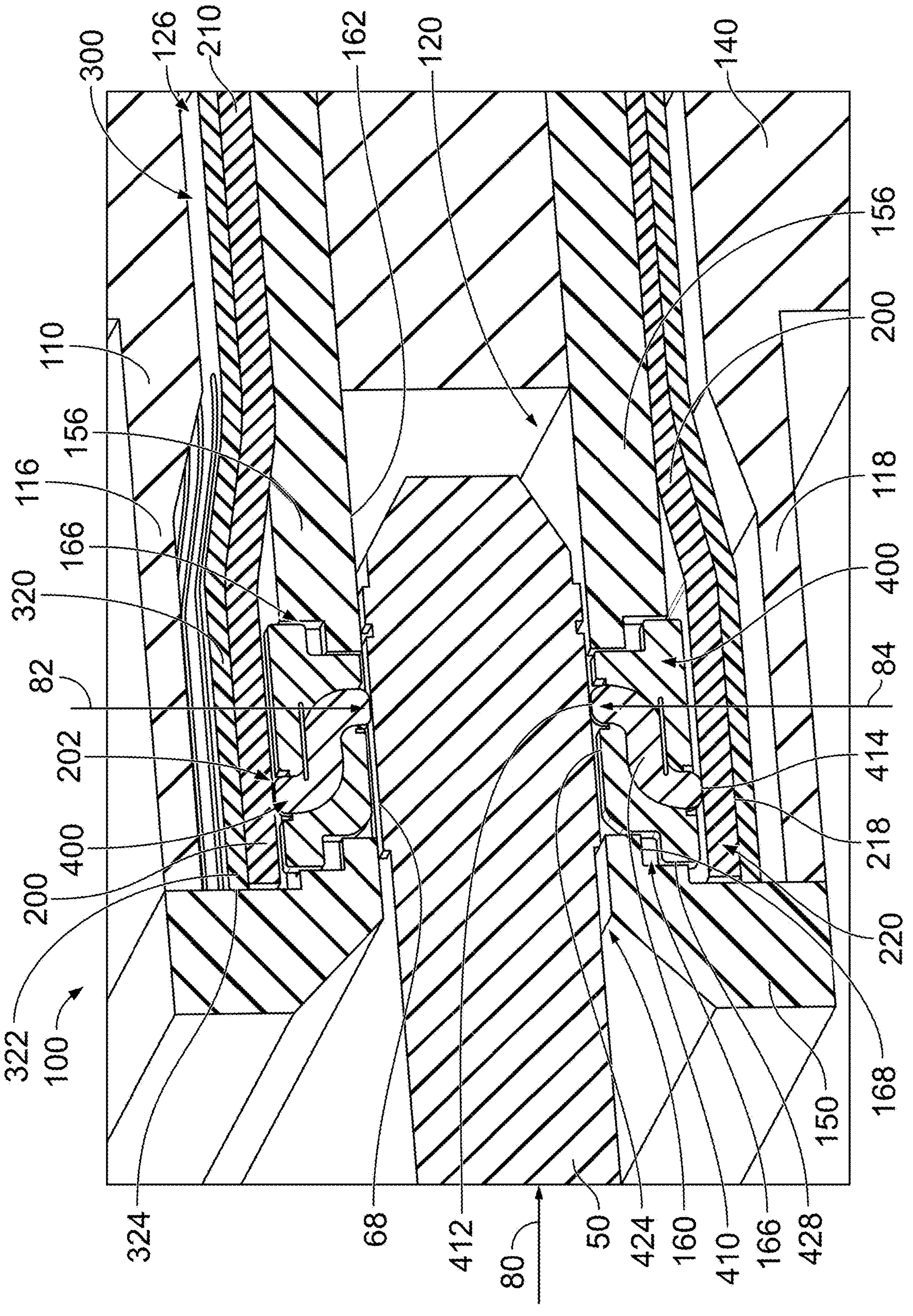
FIG. 7 is a cross-sectional view of the receptacle connector in accordance with an exemplary embodiment.

FIG. 6 is a front perspective, partial sectional view of the receptacle connector 100 in accordance with an exemplary embodiment. FIG. 7 is a cross-sectional view of the receptacle connector 100 in accordance with an exemplary embodiment. FIG. 7 illustrates the pluggable module 50 mated with the receptacle connector 100. During mating, the pluggable module 50 is plugged into the slot 160 in a loading direction 80. The flexible circuits 200 and interposer contacts 400 are mated to the pluggable module 50 in mating directions 82, 84. The mating directions 82, 84 may be generally perpendicular to the loading direction 80. In an exemplary embodiment, the flexible circuit supports 300 are used to press the flexible circuits 200 and the interposer contacts 400 in the mating directions 82, 84 to make reliable electrical connections between the interposer contacts 400 and the flexible circuits 200/pluggable module 50.

When assembled, the housing insert 150 is located in the cavity 120 of the outer shell 140. The flexible circuit supports 300 and flexible circuits 200 are located in the flexible circuit pocket 126, such as between the housing insert 150 and the outer shell 140. The interposer contacts 400 are received in the corresponding contact pockets 166 of the receptacle housing 110. In an exemplary embodiment, the housing insert 150 includes the contact pockets 166. The contact pockets 166 are used to position the interposer contacts 400 relative to each other for mating with the pluggable module 50 and the flexible circuit 200. In an exemplary embodiment, the housing insert 150 includes shoulders 168 in the contact pockets 166. The shoulders 168 are used to interface with the support tabs 428 to locate the interposer contacts 400 in the contact pockets 166. In an exemplary embodiment, the interposer contacts 400 float within the contact pockets 166. For example, the interposer contacts 400 are movable within the contact pockets 166, such as in a vertical mating direction. For example, the interposer contacts 400 may be pressed outward by the pluggable module 50 when the pluggable module 50 is plugged into the slot 160. In various embodiments, when the support tabs 428 rest against the shoulders 168, the inner end 424 of the contact support 420 is located in the slot 160 to interface with the pluggable module 50. When the pluggable module 50 is loaded into the slot 160, the pluggable module 50 forces the interposer contacts outward and lifts the support tabs 428 off of the shoulders 168. The inner ends 424 may be generally flush with the inner surface 162 of the corresponding support wall 156 when the pluggable module 50 is loaded into the slot 160. The inner mating interfaces 412 of the contact bodies 410 interface with the module contacts 68 of the pluggable module 50.

In an exemplary embodiment, the mating end 220 of each flexible circuit 200 is located in the flexible circuit pocket 126 for connection to the interposer contacts 400 and the pluggable module 50. For example, the mating ends 220 are aligned with the interposer contacts 400 outward of the interposer contacts 400. In an exemplary embodiment, the distal ends of the support elements 320 are positioned outward of the flexible circuits 200. The support elements 320 of the flexible circuit supports the corresponding flexible circuit 200 to press the circuit conductors 202 of the flexible circuit 200 into mating engagement with the interposer contacts 400, such as at the mating interfaces 414. For example, the support elements 320 extend along the outer side 218 of the corresponding substrate 210 to engage the substrate 210 opposite the circuit conductor 202. The support elements 320 of the upper flexible circuit support 300 are located between the mating end 220 of the upper flexible circuit 200 and the upper wall 116 of the receptacle housing 110. Similarly, the support elements 320 of the lower flexible circuit support 300 are located between the mating end 220 of the lower flexible circuit 200 and the lower wall 118 of the receptacle housing 110. The distal ends 324 are configured to interface with the flexible circuits 200 to press the flexible circuits 200 inward toward the interposer contacts 400. In an exemplary embodiment, the support elements 320 press the interposer contacts 400 inward toward the pluggable module 50. The support elements 320 press the inner mating interfaces 414 against the module contacts 68 of the pluggable module 50. For example, the spring fingers 322 are spring biased against the flexible circuit 200 to press the circuit conductors 202 into mating engagement with the interposer contacts 400 and to press the interposer contacts 400 into mating engagement with the module contacts 68 of the pluggable module 50.

Figure 8:
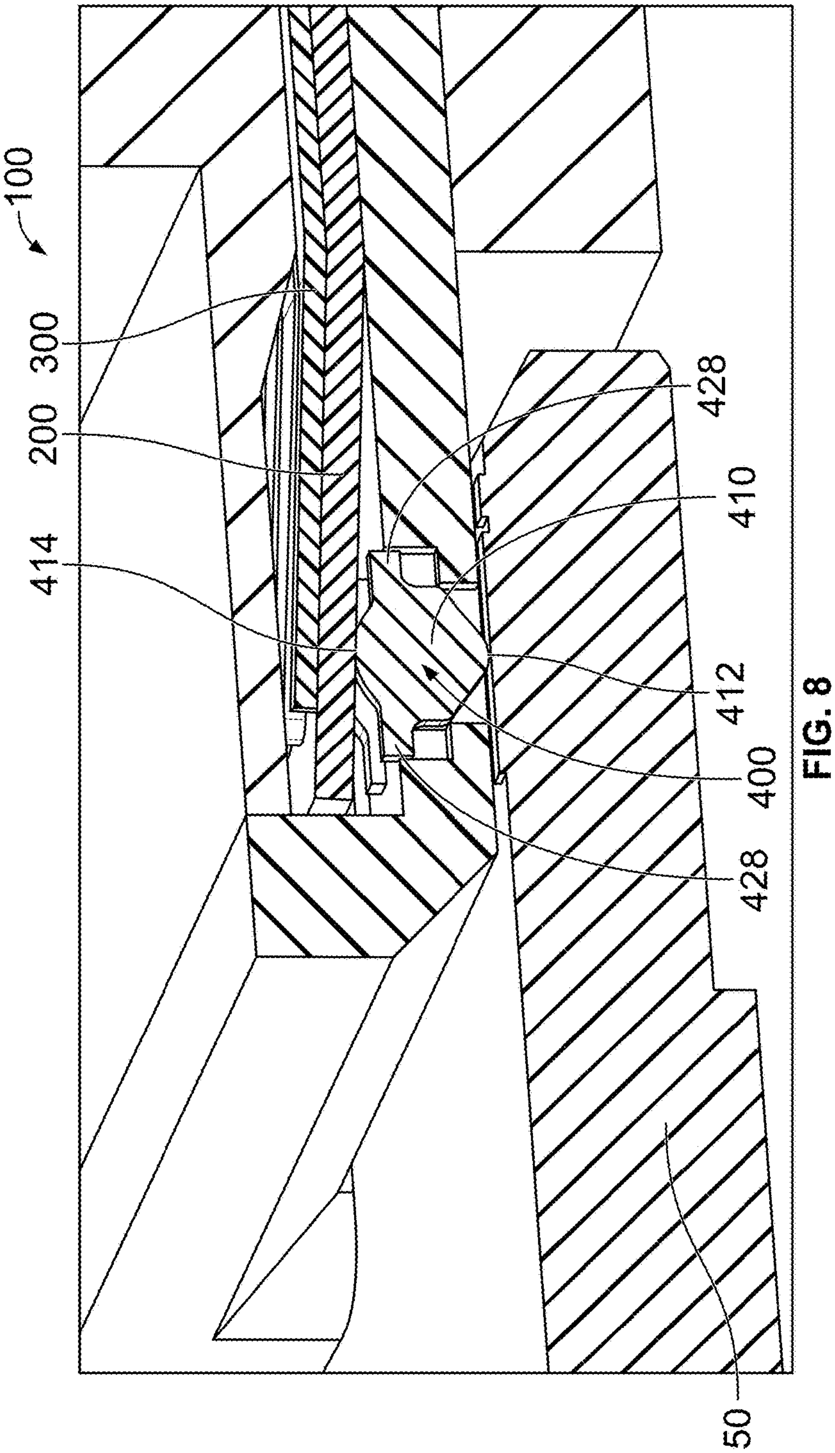
FIG. 8 is a cross-sectional view of the receptacle connector in accordance with an exemplary embodiment.

FIG. 8 is a cross-sectional view of the receptacle connector 100 in accordance with an exemplary embodiment. FIG. 8 illustrates the pluggable module 50 mated with the receptacle connector 100. In the illustrated embodiment, the interposer contact 400 is a stamped and formed contact. The interposer contact 400 includes the contact body 410; however, the interposer contact does not include the contact support 420. For example, the contact body 410 is not overmolded in the illustrated embodiment. The interposer contact 400 includes the inner mating interface 412 for mating with the pluggable module 50 and the outer mating interface 414 for mating with the flexible circuit 200. The inner and outer mating interfaces 412, 414 have curved profiles to mate with the pluggable module 50 and the flexible circuit 200. In the illustrated embodiment, the contact body 410 includes the support tabs 428, which are stamped with the contact body 410. The interposer contact 400 may have other shapes in alternative embodiments.

Figure 9:
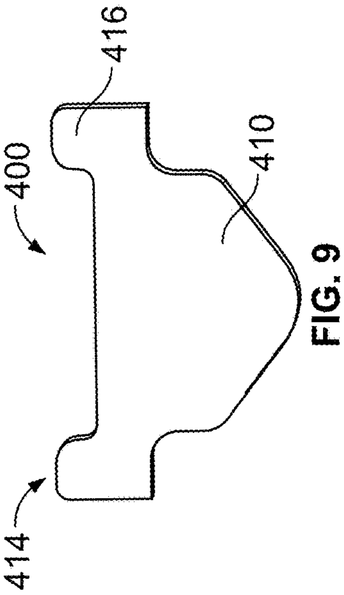
FIG. 9 illustrates the interposer contact in accordance with an exemplary embodiment.

FIG. 9 illustrates the interposer contact 400 in accordance with an exemplary embodiment. In the illustrated embodiment, the interposer contact 400 is a stamped and formed contact. The interposer contact 400 includes a plurality of mating tabs 416 at the outer mating interface 414. The mating tabs 416 are configured to mate with the flexible circuit 200. In the illustrated embodiment, the mating tabs 416 are located at the front and rear ends of the contact body 410. However, other locations are possible in alternative embodiments. The interposer contact 400 may have other shapes in alternative embodiments.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A receptacle connector comprising:

a receptacle housing having cavity, the receptacle housing having a housing mating end and a housing mounting end, the housing mounting end configured to be mounted to a host circuit board, the receptacle housing having a slot at the housing mating end configured to receive a mating end of a pluggable module, the receptacle housing including contact pockets arranged in at least one row;

a flexible circuit received in the cavity, the flexible circuit having a mating end and a terminating end, the flexible circuit including circuit conductors extending between the mating end and the terminating end, the circuit conductors configured to be terminated to the host circuit board at the terminating end; and interposer contacts received in the corresponding contact pockets, each interposer contact including an inner mating interface and an outer mating interface, the inner mating interface forming a separable interface configured to be mated with module contacts of the pluggable module, the outer mating interface being connected to the mating end of the corresponding circuit conductor.

2. The receptacle connector of claim 1, wherein the interposer contacts are movable in the contact pockets to mate with the pluggable module and the flexible circuit.

3. The receptacle connector of claim 1, wherein the interposer contacts are separate and discrete from the circuit conductors and the module contacts of the pluggable module.

4. The receptacle connector of claim 1, wherein each interposer contact includes a contact body and a contact support holding the contact body, the contact support including a dielectric body surrounding a portion of the contact body, the contact support extending between an inner end and an outer end, the contact body including the inner mating interface and the outer mating interface, the inner mating interface extending from the inner end for mating with the pluggable module, the outer mating interface extending from the outer end for mating with the corresponding circuit conductor.

5. The receptacle connector of claim 1, further comprising a flexible circuit support to support the flexible circuit in the receptacle housing, the flexible circuit support including a carrier and support elements extending from the carrier, the support elements engaging the flexible circuit to support the mating end of the flexible circuit.

6. The receptacle connector of claim 5, wherein the support elements are independently movable relative to each other to engage the flexible circuit.

7. The receptacle connector of claim 5, wherein the carrier spans across the support elements for connecting each of the support elements to each other at the carrier.

8. The receptacle connector of claim 5, wherein the support elements include spring fingers, the spring fingers engaging the flexible circuit to press the circuit conductors into mating engagement with the interposer contacts and to press the interposer contacts into mating engagement with the module contacts of the pluggable module.

9. The receptacle connector of claim 1, wherein the receptacle housing includes an upper wall above the slot and a lower wall below the slot, the upper wall including a plurality of the contact pockets, the lower wall including a plurality of the contact pockets, the flexible circuit being an upper flexible circuit coupled to the upper wall, the interposer contacts being upper interposer contacts received in the contact pockets in the upper wall to mate with the upper flexible circuit and the module contacts on an upper surface of the pluggable module, the receptacle connector further comprising a lower flexible circuit coupled to the lower wall and having circuit conductors configured to be terminated to the host circuit board, the receptacle connector further comprising lower interposer contacts received in the corresponding contact pockets in the lower wall, each lower interposer contact coupled to the corresponding circuit conductor of the lower flexible circuit and configured to be mated with module contacts on a lower surface of the pluggable module.

10. The receptacle connector of claim 1, wherein the receptacle housing includes a rear housing and a housing insert, the rear housing forming the cavity, the housing insert being received in the cavity of the rear housing and extending forward of the rear housing, a flexible circuit pocket being formed between the rear housing and the housing insert, the flexible circuit being received in the flexible circuit pocket.

11. The receptacle connector of claim 1, wherein the interposer contacts extend generally perpendicular to a loading direction of the pluggable module into the slot.

12. The receptacle connector of claim 1, wherein each contact pocket includes a shoulder, each interposer contact including a support tab engaging the shoulder to locate the interposer contact in the contact pocket, wherein the interposer contact is configured to float in the contact pocket when mated with the pluggable module such that the support tab is configured to lift off of the shoulder with the interposer contact is mated with the pluggable module.

13. The receptacle connector of claim 1, wherein the flexible circuit includes a stiffener at the terminating end, the stiffener rigidly holding the flexible circuit at the terminating end relative to the housing.

14. The receptacle connector of claim 1, wherein the flexible circuit includes a ball grid array of solder balls at the terminating end configured to be soldered to the host circuit board.

15. A receptacle connector comprising:

a receptacle housing having cavity, the receptacle housing having a housing mating end and a housing mounting end, the housing mounting end configured to be mounted to a host circuit board, the receptacle housing having a slot at the housing mating end configured to receive a mating end of a pluggable module, the receptacle housing including contact pockets arranged in at least one row;

a flexible circuit received in the cavity, the flexible circuit having a mating end and a terminating end, the flexible circuit including circuit conductors extending between the mating end and the terminating end, the circuit conductors configured to be terminated to the host circuit board at the terminating end;

a flexible circuit support to support the flexible circuit in the receptacle housing, the flexible circuit support including a carrier and support elements extending from the carrier, the support elements engaging the flexible circuit to support the mating end of the flexible circuit; and interposer contacts received in the corresponding contact pockets, each interposer contact including an inner mating interface and an outer mating interface, the inner mating interface forming a separable interface configured to be mated with the pluggable module, the outer mating interface being connected to the mating end of the corresponding circuit conductor;

wherein the support elements press the circuit conductors into mating engagement with the interposer contacts.

16. The receptacle connector of claim 15, wherein the interposer contacts are movable relative to the receptacle housing in the contact pockets to mate with the pluggable module and the flexible circuit.

17. The receptacle connector of claim 15, wherein each interposer contact includes a contact body and a contact support holding the contact body, the contact support including a dielectric body surrounding a portion of the contact body, the contact support extending between an inner end and an outer end, the contact body including the inner mating interface and the outer mating interface, the inner mating interface extending from the inner end for mating with the pluggable module, the outer mating interface extending from the outer end for mating with the corresponding circuit conductor.

18. The receptacle connector of claim 15, wherein the support elements include spring fingers independently movable relative to each other to engage the flexible circuit, the spring fingers engaging the flexible circuit to press the circuit conductors into mating engagement with the interposer contacts and to press the interposer contacts into mating engagement with the module contacts of the pluggable module.

19. A receptacle connector comprising:

a receptacle housing having cavity, the receptacle housing having a housing mating end and a housing mounting end, the housing mounting end configured to be mounted to a host circuit board, the receptacle housing having a slot at the housing mating end configured to receive a mating end of a pluggable module, the receptacle housing including contact pockets arranged in at least one row;

a flexible circuit received in the cavity, the flexible circuit having a mating end and a terminating end, the flexible circuit including circuit conductors extending between the mating end and the terminating end, the circuit conductors configured to be terminated to the host circuit board at the terminating end; and interposer contacts received in the corresponding contact pockets, each interposer contact including a contact body and a contact support holding the contact body, the contact support including a dielectric body surrounding a portion of the contact body, the contact support extending between an inner end and an outer end, the contact body including an inner mating interface extending from the inner end for mating with the pluggable module, the contact body including an outer mating interface extending from the outer end for mating with the mating end of the corresponding circuit conductor.

* * * * *